US 6,724,715 B1

(12) United States Patent
Kim et al.

(10) Patent No.: US 6,724,715 B1
(45) Date of Patent: Apr. 20, 2004

(54) OPTICAL RECORDING MEDIUM HAVING OPTICAL REACTION LAYER

(75) Inventors: Jin Hong Kim, Kyonggi-do (KR); Chul Park, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/502,012

(22) Filed: Feb. 11, 2000

(30) Foreign Application Priority Data

Feb. 13, 1999 (KR) .......................................... 1999/5241
Feb. 13, 1999 (KR) .......................................... 1999/5242

(51) Int. Cl.$^7$ .............................. G11B 7/24; B32B 3/02
(52) U.S. Cl. ................... 369/275.1; 369/288; 428/64.4
(58) Field of Search ........................ 369/275.1, 275.3, 369/275.4, 288, 283, 286, 280; 428/64.1, 64.4, 64.5, 64.6; 430/270.11

(56) References Cited

U.S. PATENT DOCUMENTS 5,981,014 A * 11/1999 Tsukagoshi et al. ....... 428/64.1
6,141,315 A * 10/2000 Ebina et al. .............. 369/275.2
6,177,167 B1 * 1/2001 Yuzurihara et al. ........ 428/64.1

* cited by examiner

*Primary Examiner*—Ali Neyzari
(74) *Attorney, Agent, or Firm*—Birch, Stewart, Kolasch & Birch, LLP

(57) ABSTRACT

An optical recording medium improves recording density at a simple structure by forming an optical reaction layer, which transmits a laser beam at a predetermined temperature, on or below of a recording layer.

23 Claims, 2 Drawing Sheets

OPTICAL RECORDING MEDIUM HAVING OPTICAL REACTION LAYER

BACKGROUND OF THE INVENTION

1. Field of the Invention

The present invention relates to an optical recording medium, and more particularly, to an optical recording medium which enables optical recording of high density.

1. Background of the Related Art

Recently, as requests for information recording/reproducing of high density increase, an optical recording medium is gradually on a spreading trend, which records/reproduces information at high density by using the thermal energy of a laser beam or applying the laser beam and magnetic field together.

As an example of an optical recording medium using the thermal energy of a laser beam, there is a phase variation type optical disk which uses the phase variation of a material in a recording layer. As an example of an optical recording medium using a laser beam and magnetic field together, there is an optical magnetic disk.

In case of the phase variation type optical disk, overwriting is directly possible. Also, this optical disk records/reproduces information by optical means only. Therefore, information can be exchanged between respective media.

In case of the optical magnetic disk, repeat recording of information and erasing of information are possible and high density can be facilitated. In this respect, it is expected that the optical magnetic disk is to be developed to the large extent in the future.

The optical magnetic disk records information by forming a magnetic domain on a vertical magnetization thin film using a laser beam and magnetic field, and reproduces information using magneto-optic effect.

An alloy material of rare earth-transition metal(RE-TM) is mainly used as a recording layer of the optical magnetic disk. A ferromagnetic element such as Fe and Co is used as a transition metal, and Tb, Dy, Gd, Sm, and Ho are used as a rare-earth element.

Particularly, such an optical magnetic disk is characterized in that more information is recorded in a unit area and such information is reproduced without any error.

To efficiently record more information in a unit area, there has been suggested a laser-pumped magnetic field modulation method. In this method, a small and stable magnetic domain can be formed by applying a laser pulse and external magnetic field at the same time. However, since the magnetic domain is too smaller than the size of a recording laser beam, there is a problem in reproducing the magnetic domain.

Since the magnetic domain for reproduction is smaller than a diameter of a reproducing laser beam, a signal is applied thereto from an adjacent magnetic domain when reproducing the magnetic domain, thereby increasing noise. If noise increases, signal-to-noise ratio is relatively reduced, thereby generating reproducing error.

To solve such problems, special reproducing methods have been required.

There has been provided a method in which a mechanism is used, which replicates a signal of a recording layer by opening a window of a reproducing layer in a diameter portion of a reproducing laser beam having a high temperature. In this method, magnetization direction of the reproducing layer is horizontal at a room temperature.

There has been also provided a method for making a reproducing signal large by expanding a magnetic domain recorded on the recording layer in the reproducing layer. This is applied in case of high recording density.

In addition to the above methods, there have been provided a multi-valued recording method and a multi-wavelength recording method. In the multi-valued recording method, the recording layer is multilayered for high density recording. In the multi-wavelength recording method, various recording wavelengths are formed.

However, the above related art methods have several problems.

In case of the laser-pumped magnetic field modulation method, although the recording density in the advance direction of a laser beam can be improved, it is difficult to improve the recording density in the disk track direction.

In case of the multi-valued recording method and the multi-wavelength recording method, there are problems that a structure of the disk is complicate and fabrication processes are difficult.

SUMMARY OF THE INVENTION

Accordingly, the present invention is directed to an optical recording medium that substantially obviates one or more of the problems due to limitations and disadvantages of the related art.

An object of the present invention is to provide an optical recording medium which improves recording density at a simple structure by forming an optical reaction layer of a new material.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an optical recording medium having a recording layer for recording information through a laser beam, includes an optical reaction layer formed on or below the recording layer, which is melted at a predetermined temperature or causes optical change to vary a refractive index, thereby transmitting the laser beam.

In one embodiment of the present invention, the optical reaction layer is formed of either any one of Ge, As, Se, Sn, Sb, Te and Bi, or their alloy, and is melted at a temperature of 300~800° C. so as to form a transparent window for transmitting the laser beam. Also, a reproducing layer may be formed between the optical reaction layer and the recording layer to reproduce information of the recording layer.

In another aspect, an optical recording medium according to the present invention includes: a substrate; a first dielectric layer formed on the substrate; an optical reaction layer formed on the first dielectric layer, for being melted at a predetermined temperature or causing optical reaction to vary a refractive index, thereby transmitting a laser beam; a second dielectric layer formed on the optical reaction layer; a recording layer formed on the second dielectric layer, for recording information by the laser beam; and a passivation layer formed on the recording layer.

In another embodiment of the present invention, a reproducing layer may be formed between the optical reaction layer and the second dielectric layer to make a reproducing signal large by expanding information transcribed from the recording layer.

In other aspect, an optical recording medium according to the present invention includes: a substrate; a reflecting layer formed on the substrate; a recording layer formed on the reflecting layer, for recording information by a laser beam; a first passivation layer formed on the recording layer; an optical reaction layer formed on the first passivation layer, for being melted at a predetermined temperature or causing optical reaction to vary a refractive index, thereby transmitting the laser beam; and a second passivation layer formed on the optical reaction layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

First embodiment

Figure 1:
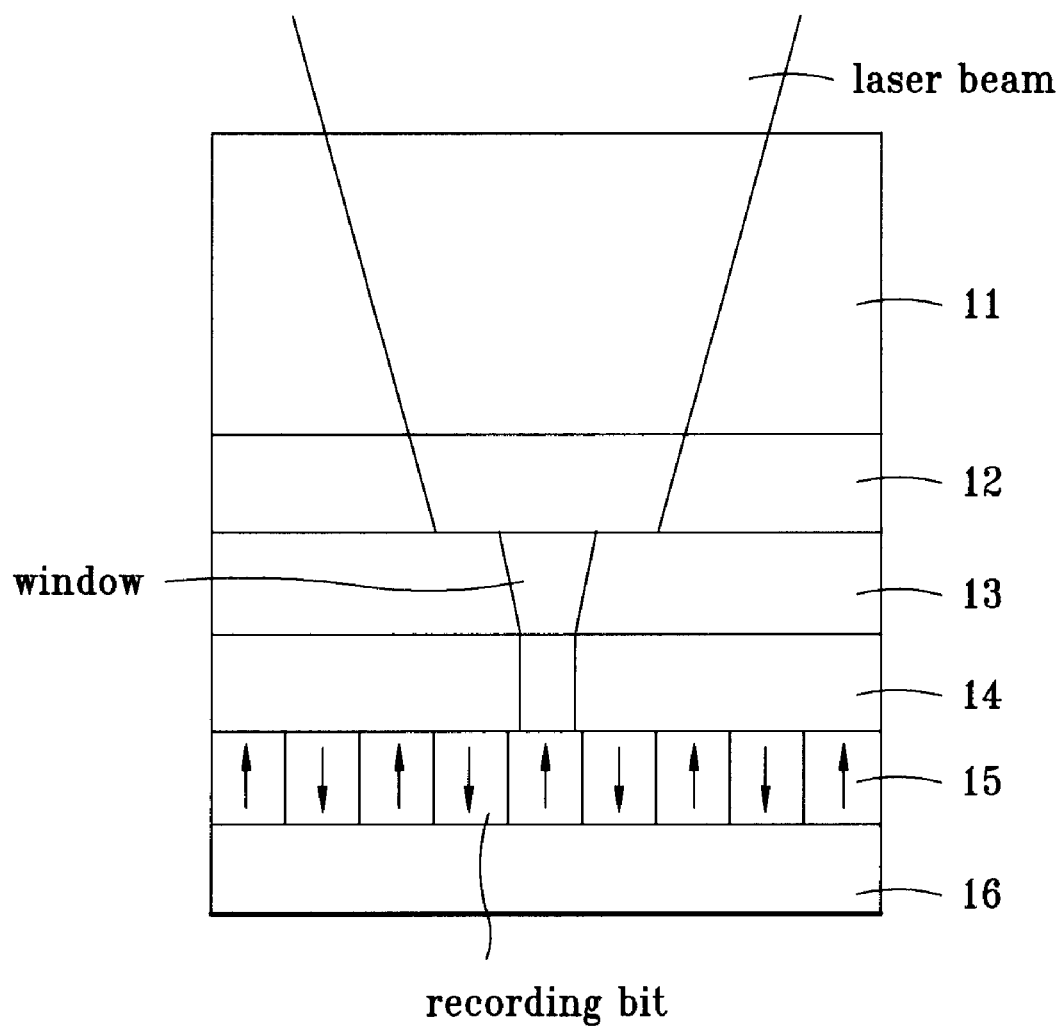
FIG. 1 is a sectional view illustrating an optical disk according to the first embodiment of the present invention.

FIG. 1 is a sectional view showing an optical disk in accordance with the first embodiment of the present invention. As shown in FIG. 1, the optical disk includes a first dielectric layer 12, an optical reaction layer 13, a second dielectric layer 14, a recording layer 15 for recording information, and a passivation layer 16 sequentially formed on a substrate 11.

The first dielectric layer 12, the second dielectric layer 14 and the passivation layer 16 are formed of $Si_3N_4$ or AlN, and the recording layer 15 is formed of a rare earth-transition metal (RE-TM) or a Co based multilayered thin film.

The optical reaction layer 13 is formed of any one of Ge, As, Se, Sn, Sb Te and Bi, or their alloy. This is because these materials are melted at a temperature of 300~800° C. or are subject to optical change, thereby varying a refractive index to form a transparent window for transmitting a laser beam.

Since the transparent window is formed smaller than a spot of the laser beam for recording, it is possible to enable a high-density recording on the recording layer.

Furthermore, the optical reaction layer 13 is preferably formed with a thickness of 100~450Å, the first dielectric layer 12 of 700Å, and the second dielectric layer 14 of 100~450Å.

A recording/reproducing method of the aforementioned optical disk according to the present invention will be described.

First, the recording method will be described. As shown in FIG. 1, the laser beam is to be incident upon the substrate 11. The laser beam incident upon the substrate 11 reaches the optical reaction layer 13 through the first dielectric layer 12.

At this time, since the temperature distribution of the laser beam has a Gausian intensity profile, a center of the laser beam has the highest temperature. Therefore, the optical reaction layer 13 located at the center of the laser beam is melted or is subject to optical change. As a result, a refractive index is changed and a transparent window is opened to transmit the laser beam.

The laser beam has a microscopic spot and the transparent window is smaller than the spot of the laser beam. The laser beam is transmitted to the recording layer 15 through the second dielectric layer 14 so as to record information on the recording layer 15 at high density.

Furthermore, since the optical reaction layer 13 is melted at a temperature of 300~800° C. and forms a transparent window, it is advantageous in that the laser beam of a reproducing optical system can be applied.

Meanwhile, in the reproducing method, information on the recording layer is reproduced in the same manner as the recording method.

However, since a small domain (information) which is recorded in the recording layer 15 is much smaller than the laser beam, the boundary part has a threshold value of a Gausian distribution curve of the laser beam. Accordingly, the domain is unclearly reproduced, thereby deteriorating quality of a signal and reducing resolution.

Therefore, a reproducing layer is formed between the optical reaction layer 13 and the recording layer 15, so that a domain in the recording layer 15 may be transcribed to the reproducing layer. The transcribed domain can be enhanced by a magnetic field externally applied in DC, AC or pulse type and then reproduced.

At this time, a dielectric layer is formed between the optical reaction layer and the reproducing layer and between the reproducing layer and the recording layer.

Second embodiment

Figure 2:
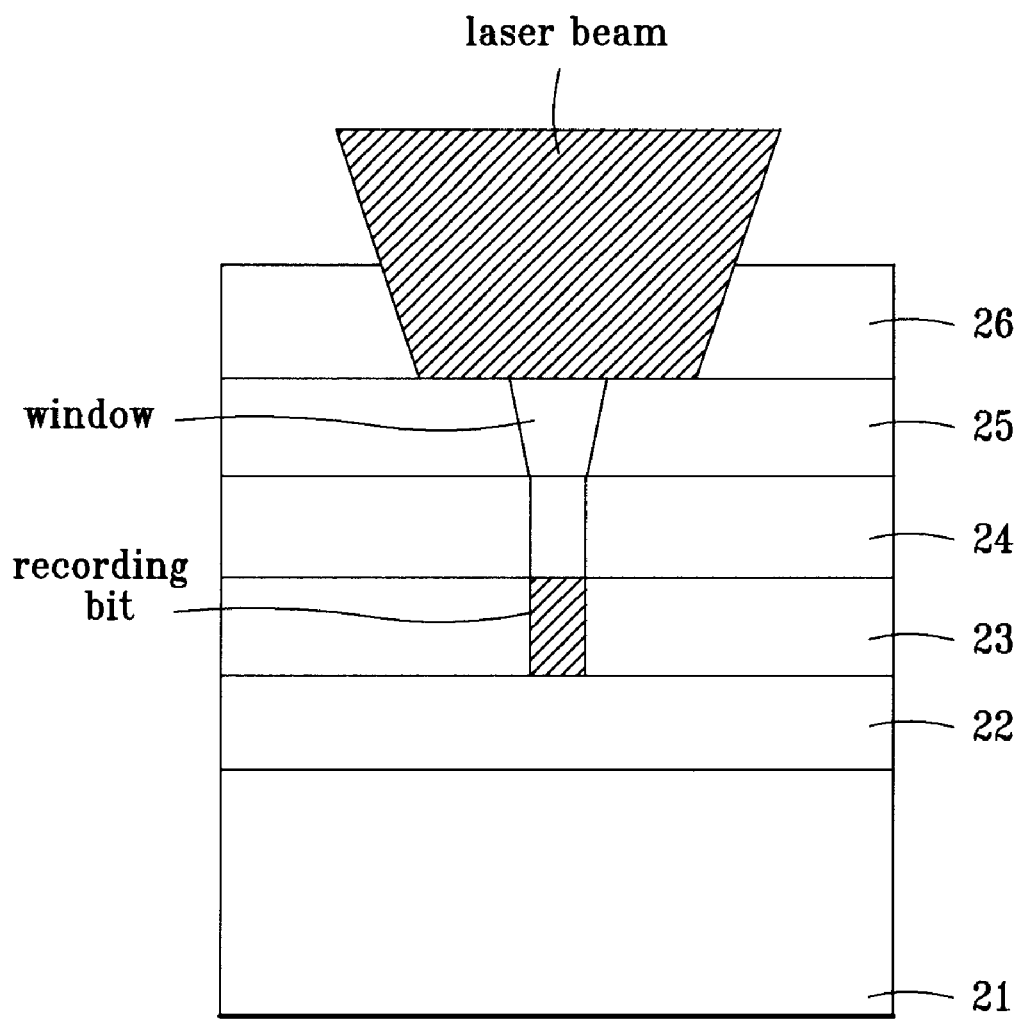
FIG. 2 is a sectional view illustrating an optical disk according to the second embodiment of the present invention.

FIG. 2 is a sectional view showing an optical disk in accordance with the second embodiment of the present invention. As shown in FIG. 2, the optical disk includes a substrate 21, a reflecting layer 22, a recording layer 23 for recording information, a first passivation layer 24, an optical reaction layer 25, and a second passivation layer 26 sequentially formed on the substrate 21.

The first passivation layer 24 and the second passivation layer 26 are formed of $Si_3N_4$ or AlN and the recording layer 23 is formed of any one of azometal, phthalocyanine, metincyanine based organic material and In-Sb or Te-Bi based metal material. The reflecting layer 22 is formed of Au or Ag. Additionally, the optical reaction layer 25 is formed of any one of Ge, As, Se, Sn, Sb, Te and Bi, or their alloy.

The recording/reproducing method of the aforementioned optical disk in accordance with the second embodiment of the present invention is the same as that of the first embodiment.

First, the recording method will be described.

The laser beam is to be incident upon the second passivation layer 26. If the laser beam incident upon the second passivation layer 26 reaches the optical reaction layer 25, the optical reaction layer 25 at a center of the laser beam is melted at a temperature of 300~800° C. or is subject to optical change. As a result, a refractive index is changed and a transparent window is opened to transmit the laser beam.

The laser beam has a microscopic spot and the transparent window is smaller than the spot of the laser beam. Accordingly, the laser beam permits information to record on the recording layer 23 through the first passivation layer 24.

Meanwhile, in the reproducing method, information on the recording layer is reproduced in the same manner as the recording method.

As aforementioned, the optical recording medium of the present invention has the following advantages.

The optical recording medium according to the present invention has a simple structure, applies to the related art reproducing optical system, and effectively improves a recording density.

It will be apparent to those skilled in the art that various modifications and variations can be made in the optical recording medium according to the present invention without departing from the spirit or scope of the invention. Thus, it is intended that the present invention covers the modifications and variations of the invention provided they come within the scope of the appended claims and their equivalents.

What is claimed is:

1. An optical recording medium comprising:
    a recording layer for recording information through a laser beam; and
    an optical reaction layer formed on or below the recording layer,
    wherein the optical reaction layer is melted at a predetermined temperature or causes optical change to vary a refractive index, thereby transmitting the laser beam through the melted area or the optically changed area of the optical reaction layer, and
    wherein the laser beam is transmitted through a window, which has a smaller diameter than a spot size of the laser beam and is formed on the melted area or the optically changed area of the optical reaction layer.

2. The optical recording medium as claimed in claim 1, wherein the optical reaction layer is made of any one of Ge, As, Se, Sn, Sb, Te and Bi, or their alloy.

3. The optical recording medium as claimed in claim 1, wherein the optical reaction layer is melted at a temperature of 300~800° C.

4. The optical recording medium as claimed in claim 1, wherein the optical reaction layer has a thickness of 100~450Å.

5. The optical recording medium as claimed in claim 1, further comprising a reproducing layer formed between the optical reaction layer and the recording layer to reproduce information of the recording layer.

6. The optical recording medium as claimed in claim 5, further comprising a dielectric layer is formed between the optical reaction layer and the reproducing layer and between the reproducing layer and the recording layer.

7. The optical recording medium as claimed in claim 1, wherein the laser beam is to be incident upon the optical reaction layer.

8. An optical recording medium comprising:
    a substrate;
    a first dielectric layer formed on the substrate;
    an optical reaction layer formed on the first dielectric layer, for being melted at a predetermined temperature or causing optical reaction to vary a refractive index, thereby transmitting a laser beam through a window, which has a smaller diameter than a spot size of the laser beam;
    a second dielectric layer formed on the optical reaction layer;
    a recording layer formed on the second dielectric layer, for recording information by the laser beam; and
    a passivation layer formed on the recording layer.

9. The optical recording medium as claimed in claim 8, wherein the optical reaction layer is made of any one of Ge, As, Se, Sn, Sb, Te and Bi, or their alloy.

10. The optical recording medium as claimed in claim 8, wherein the optical reaction layer is melted at a temperature of 300~800° C.

11. The optical recording medium as claimed in claim 8, further comprising a reproducing layer formed between the optical reaction layer and the second dielectric layer to enlarge a reproducing signal by expanding information transcribed from the recording layer.

12. The optical recording medium as claimed in claim 8, wherein the recording layer is formed of any one of an alloy of rare earth-transition metal and Co based multi-layered thin film.

13. The optical recording medium as claimed in claim 8, wherein the first dielectric layer, the second dielectric layer and the passivation layer are formed of $Si_3N_4$ or AlN.

14. The optical recording medium as claimed in claim 8, wherein the laser beam is to be incident from the substrate.

15. An optical recording medium comprising:
    a substrate;
    a reflecting layer formed on the substrate;
    a recording layer formed on the reflecting layer, for recording information by a laser beam;
    a first passivation layer formed on the recording layer;
    an optical reaction layer formed on the first passivation layer, for being melted at a predetermined temperature or causing optical reaction to vary a refractive index, thereby transmitting the laser beam through a window, which has a smaller diameter than a spot size of the laser beam; and
    a second passivation layer formed on the optical reaction layer.

16. The optical recording medium as claimed in claim 15, wherein the optical reaction layer is made of any one of Ge, As, Se, Sn, Sb, Te and Bi, or their alloy.

17. The optical recording medium as claimed in claim 15, wherein the optical reaction layer is melted at a temperature of 300~800° C.

18. The optical recording medium as claimed in claim 15, wherein the recording layer is formed of any one of azometal, phthalocyanine, metincyanine based organic material, and In-Sb or Te-Bi based metal material.

19. The optical recording medium as claimed in claim 15, wherein the first passivation layer and the second passivation layer are formed of $Si_3N_4$ or AlN.

20. The optical recording medium as claimed in claim 15, wherein the laser beam is to be incident from the second passivation layer.

21. An optical recording medium comprising:
    a recording layer for recording information through a laser beam; and
    an optical reaction layer formed on or below the recording layer,
    wherein the optical reaction layer is melted at a predetermined temperature or causes optical change to vary a refractive index, thereby transmitting the laser beam; and wherein the optical reaction layer is melted at a temperature of 300~800° C.

22. An optical recording medium comprising:

a recording layer for recording information through a laser beam;

an optical reaction layer formed on or below the recording layer, wherein the optical reaction layer is melted at a predetermined temperature or causes optical change to vary a refractive index, thereby transmitting the laser beam; and a reproducing layer formed between the optical reaction layer and the recording layer to reproduce information of the recording layer.

23. An optical recording medium comprising:

a recording layer to record information thereon using a light beam; and an optical reaction layer over the recording layer, wherein when the light beam impinges on the optical reaction layer, a window is created in the optical reaction layer and the window reduces a spot size of the light beam to allow passing of a part of the light beam to the recording layer and to prevent passing of another part of the light beam to the recording layer.

* * * * *